United States Patent [19]

Schroll

[11] Patent Number: 4,467,018
[45] Date of Patent: Aug. 21, 1984

[54] MANIFOLD DIELECTRIC BARRIER FOR A FUEL CELL ELECTRICAL POWER GENERATION SYSTEM

[75] Inventor: Craig R. Schroll, Hartford County, Conn.

[73] Assignee: Electric Power Research Institute, Palo Alto, Calif.

[21] Appl. No.: 288,913

[22] Filed: Jul. 31, 1981

[51] Int. Cl.³ .............................................. H01M 8/24
[52] U.S. Cl. ........................................ 429/18; 429/35; 29/623.2
[58] Field of Search ....................... 429/38, 39, 18, 34, 429/35, 36, 37, 26; 29/623.2

[56] References Cited

U.S. PATENT DOCUMENTS

| | | | |
|---|---|---|---|
| 3,476,609 | 11/1969 | Gelting et al. | 429/37 |
| 3,964,929 | 6/1976 | Grevstad | 136/86 R |
| 3,964,930 | 6/1976 | Reiser | 136/86 R |
| 3,969,145 | 7/1976 | Grevstad et al. | 136/86 R |
| 3,981,745 | 9/1976 | Stedman | 204/266 |
| 4,269,642 | 5/1981 | DeCasperis et al. | 429/36 |
| 4,276,355 | 6/1981 | Kothmann et al. | 429/35 |

Primary Examiner—Donald L. Walton
Attorney, Agent, or Firm—Flehr, Hohbach, Test, Albritton & Herbert

[57] ABSTRACT

A manifold dielectric barrier for use in a power section of a fuel cell electrical power generation system. The power section comprises a fuel cell stack and two external reactant manifolds for respectively conveying oxygen-rich gas and fuel into the fuel cell stack. The power section also includes discharge manifolds for conveying spent products away from the fuel cell stack. The manifold dielectric barrier dielectrically isolates the fuel cell stack from each of the manifolds. The manifold dielectric barrier includes an impermeable ceramic member, a first ceramic gasket intermediate of and contiguous with the ceramic member and the fuel cell stack, and a second ceramic gasket intermediate of and contiguous with the ceramic member and each of the manifolds.

15 Claims, 7 Drawing Figures

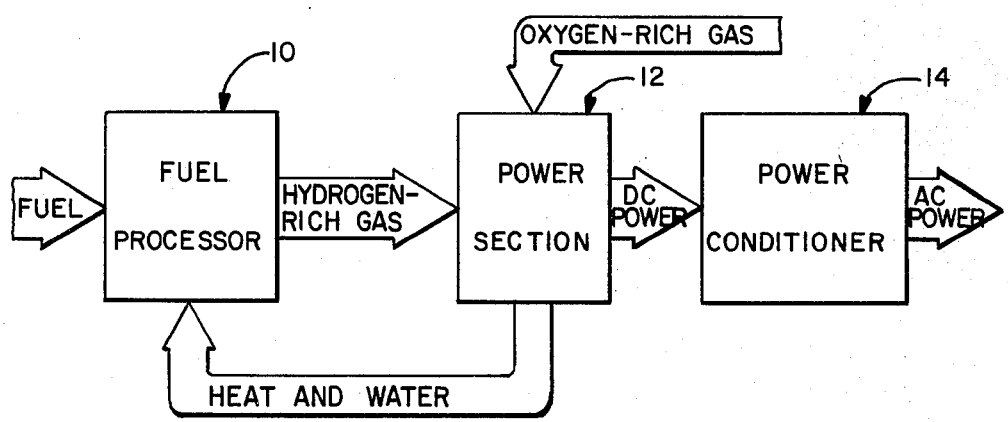
FIG.—1
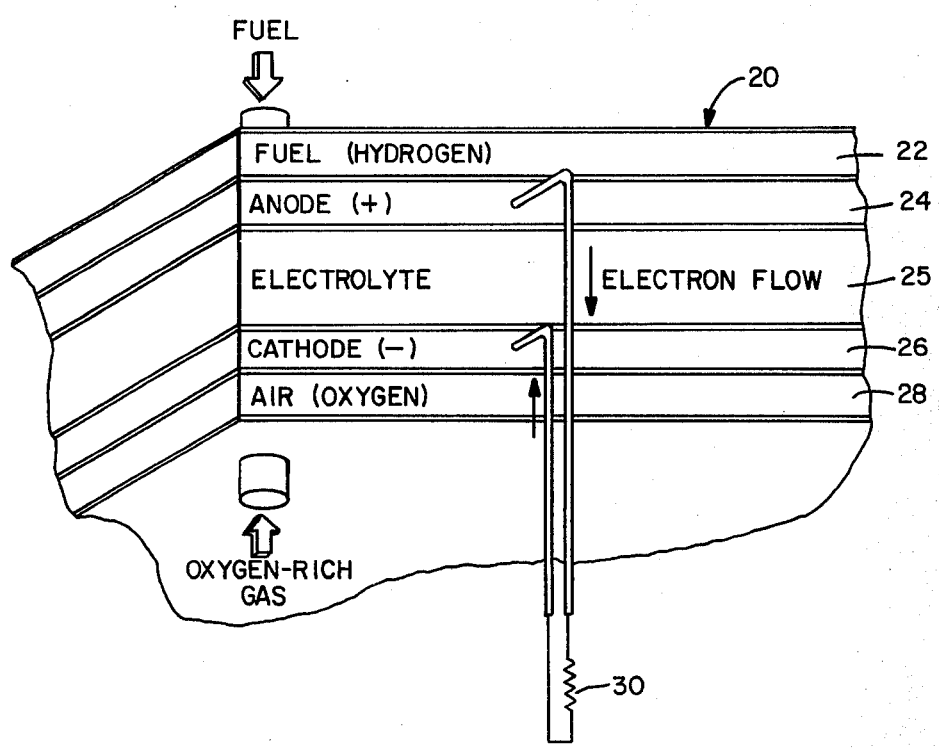
FIG.—2

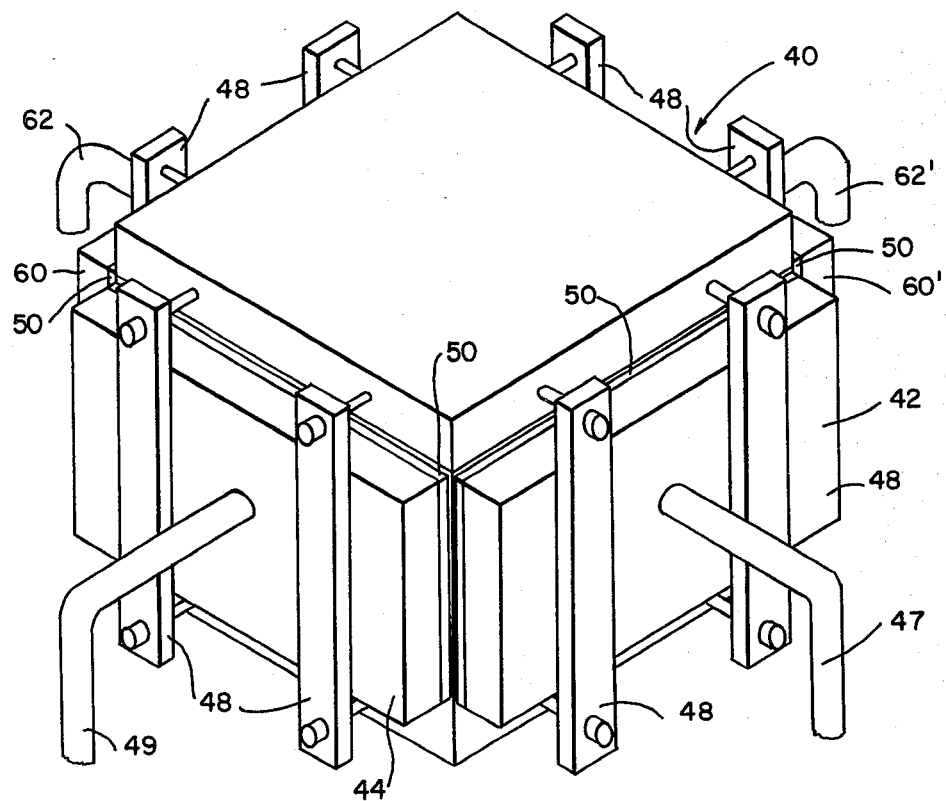
FIG.—3
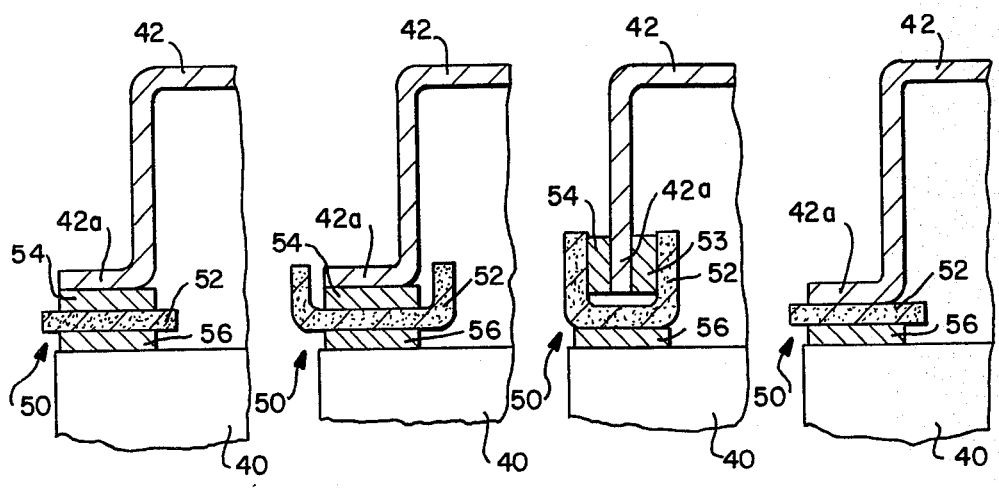
FIG.—4A   FIG.—4B   FIG.—4C   FIG.—4D

MANIFOLD DIELECTRIC BARRIER FOR A FUEL CELL ELECTRICAL POWER GENERATION SYSTEM

The present invention relates to fuel cell electrical power generation systems, and more particularly, to a manifold dielectric barrier for dielectrically isolating the fuel cell stack from external reactive manifolds.

Fuel cell electrical power generation systems convert the chemical energy of a fuel directly into electricity, with no intermediate combustion or thermal cycles. The main component of the system is the power section which consists of individual fuel cells assembled into fuel cell stacks. Each individual fuel cell includes an electrolyte sandwiched between two electrodes. The principle of operation of the fuel cell is relatively simple. In a molten carbonate electrolyte fuel cell, for example, a hydrogen-rich fuel is passed over one electrode and an oxygen-rich gas is passed over the other electrode. With the assistance of a catalyst in the fuel cell, the oxygen at one electrode splits and reacts with carbon dioxide to form carbonate ions and electrons. The carbonate ions and electrons move in separate paths toward the hydrogen at the other electrode, where they combine to produce water and carbon dioxide. In this migration, the carbonate ions move through the electrolyte, and the electrons move through an external circuit. The movement of the electrons through the circuit generates direct current.

A single fuel will produce between 0.6 and 1.0 volts dc. Current levels depend on the rate of cell reactions and the area available for these reactions. To increase voltage to the levels necessary for large-scale power generation, the individual cells are assembled into fuel cell stacks. Fuel cell stacks can generate hundreds of volts dc at power ratings ranging from kilowatts to megawatts. The stacks can be connected in series or parallel to produce power at the voltage and current desired.

The fuel and oxygen-rich gas are typically conveyed to the fuel cell or fuel cell stack through external reactant manifolds appropriately joined to the fuel cell or fuel cell stack. It is important that the external reactant manifolds be dielectrically isolated from the fuel cell stack to prevent cells from being shorted together either electrically or ionically. Previously, in molten carbonate fuel cells it has been known to use ceramic ($Al_2O_3$) coatings on the manifold sealing flanges to provide dielectric isolation of the reactant manifolds. These coatings, however, are expensive and not totally effective in dielectrically isolating the fuel cell stack from the manifolds. For even with these coatings, ionic bridging has occurred between the fuel cell stack and the manifolds by means of electrolyte films which permeate the coatings. With total stack voltage as the driving potential, ionic currents have caused stack electrical shorting across the resulting corrosion products which will deposit within the ceramic coatings. This can lead to failure of the fuel cell stack.

Accordingly, an object of the present invention is to provide an effective barrier between the manifold and the fuel cell stack which dielectrically isolates the manifold from the fuel cell stack.

The present invention is directed to a manifold dielectric barrier for use with a fuel cell electrical power generation system. The electrical power generation system includes a fuel cell stack, a first external reactant manifold joined to the fuel cell stack for conveying fuel into the stack, a second external reactant manifold joined to the stack for conveying an oxygen-rich gas into the stack, and external discharge manifolds joined to the stack for conveying spent products away from the stack. The manifold dielectric barrier is disposed between the fuel cell stack and each of the manifolds in order to dielectrically isolate the stack from the manifolds. The manifold dielectric barrier comprises an impermeable ceramic member, a first porous ceramic gasket intermediate of and contiguous with the ceramic member and the fuel cell stack, and a second porous ceramic gasket intermediate of and contiguous with the ceramic member and the respective manifolds.

The impermeable ceramic member is a dense ceramic member which prevents the formation of a shunt current path between the fuel cell stack and the reactant manifolds and through which the electrolyte in the fuel cell stack cannot flow. The ceramic gaskets may be porous crush gaskets. The manifold dielectric barrier may be a single element, or it may be comprised of a number of discrete segments joined or fitted together to dielectrically isolate the fuel cell stack from the manifolds.

The present invention will be described in more detail hereinafter in conjunction with the drawings wherein:

FIG. 1 is a block diagram illustrating the major components of a fuel cell electrical power generation system;

FIG. 2 is a schematic illustration of a fuel cell;

FIG. 3 is a schematic view which illustrates the power section of a fuel cell electrical power generation system; and FIGS. 4A–4D illustrate various embodiments of the manifold dielectric barrier of the present invention.

Referring now to the drawings, attention is first directed to FIG. 1 which shows the three major components or subsystems of a fuel cell electrical power generation system. The major components are a fuel processor or reformer 10, a power section 12, and a power conditioner 14. The fuel processor converts conventional, available utility fuel into a hydrogen-rich gas. The power section, which is composed of a number of fuel cell stacks, converts hydrogen and oxygen, which is taken from the ambient air, to water and electricity. The power conditioner converts the dc power produced by the power section to ac power compatible with the utility bus. As shown in FIG. 1, the heat and water produced in the power section of the fuel cell electrical power generation system may be returned to the fuel processor section.

The heart of the fuel cell generation system is the power section. The power section is made up of a number of individual fuel cell stacks connected either in series or parallel. Each stack contains many individual cells, each cell capable of electrochemically reacting fuel and air to produce dc power. The voltage level and power output for the power section is dependent upon the number of cells in each stack and the number of stacks connected together. A power section heretofore fabricated comprised twenty stacks with each stack having nearly 500 cells and producing 240 kilowatts of dc power per stack for a combined power output of 4.8 MWdc.

The principle of operation of the fuel cell itself can be understood by referring to FIG. 2. As discussed, a fuel cell 20 converts the energy of a fuel directly into electricity by an electrochemical process. The efficiency of a fuel cell is thus not limited by the Carnot-cycle principle of thermo machines, and because the same electrochemical reactions occur in each individual cell, power plant efficiency is nearly independent of the number of cells and plant size.

Fuel cell 20 illustrated in FIG. 2 comprises an electrolyte 25 sandwiched between an anode 24 and a cathode 26. First-generation fuel cells use phosphoric acid as the electrolyte. The more advanced, second-generation fuel cells, which attempt to extend fuel capabilities, improve endurance, and lower cost, use molten carbonate as the electrolyte. The molten carbonate fuel cells operate at much higher temperatures than do the fuel cells which use phosphoric acid as the electrolyte. For instance, molten carbonate fuel cells operate at temperatures of between 600° C. and 700° C. while a phoshoric acid electrolyte fuel cell has an operating temperature between 150° C. and 200° C. Although the present invention may be used with both types of fuel cells, it is best suited for use with molten carbonate fuel cells.

In operation, a hydrogen-rich fuel is introduced into fuel cell 20 through an external reactant manifold 22. An oxygen-rich gas is introduced into fuel cell 20 through external reactant manifold 28. Molten carbonate fuel cells may use air containing large quantities of carbon dioxide. The fuel passes over the anode, and the air moves past the cathode. The air at cathode 26 reacts with carbon dioxide and forms carbonate ions and electrons. The carbonate ions and electrons move in separate paths towards the hydrogen at anode 24. The carbonate ions move through electrolyte 25 and the electrons through an external circuit containing power load 30. At anode 24 they combine with hydrogen to produce water and carbon dioxide. The movement of the electrons through the external circuit generates a direct current. The carbon dioxide evolved at anode 24 may be returned to cathode 26 to maintain the reactant balance.

FIG. 3 is a more detailed view of the power section of the fuel cell electrical power generation system, illustrating a fuel cell stack 40 and external reactant manifolds 42 and 44. Fuel cell stack 40 consists of a plurality of individual fuel cells. External reactant manifold 42 is joined to fuel cell stack 40 to convey fuel in the fuel cell stack. The second external reactant manifold 44 is joined to the fuel cell stack to convey an oxygen-rich gas into the fuel cell stack. External reactant manifolds 42 and 44 may be strapped to the fuel cell stack, or as illustrated they may be clamped thereto by means of clamps 48. Conduit means 47 and 49 convey fuel and oxygen-rich gas, respectively, into manifolds 42 and 44. Both the fuel and oxygen-rich gas are fed into the manifolds under pressure. External discharge manifolds 60 and 60' and conduits 62 and 62' are used to convey spent products such as water and other by-products away from the fuel cell stack.

A manifold dielectric barrier 50 is disposed between the respective manifolds 42, 44, 60 and 60' and the fuel cell stack. As illustrated, barrier 50 is disposed about the periphery of that side of the manifolds located next to or facing the fuel cell stack, see also FIG. 4A. The manifold dielectric barrier 50 of the present invention is designed to dielectrically isolate the manifolds from the fuel cell stack to prevent the formation of a shunt current path therebetween. Without such protection, ionic bridging would occur between the fuel cell stack and the manifolds and with the total stack voltage as the driving potential, ionic corrosion currents would eventually cause electrical shorting across the interface of the stack and manifolds. This could cause the fuel cell stack to fail.

Manifold dielectric barrier 50 of the present invention is illustrated in greater detail in FIG. 4A where the positioning of barrier 50 with respect to manifold 42 is shown, the arrangement of barrier 50 relative to the other manifolds 44, 60 and 60' being the same. As illustrated, dielectric barrier 50 is disposed between a flange portion 42a of manifold 42 and the fuel cell stack. Manifold dielectric barrier 50 comprises an impermeable dense ceramic member 52 located between ceramic gaskets 54 and 56. Gaskets 54 and 56 are preferably porous crush gaskets. Impermeable member 52 provides an electrical resistive barrier which also prevents the formation of a shunt current path between the cell stack and the manifolds. The thickness of the barrier is a function of the voltage potential of the fuel cell stack. For instance, for a stack with a potential of 500 volts dc, member 52 would have to have a thickness of approximately one inch. If the voltage potential of the stack was less, the thickness of member 52 could be smaller.

The manifold dielectric barrier 50 illustrated is fabricated as a unitary barrier. However, it could comprise a multiple number of segments using any one of a number of conventional butt, overlap, or labyrinth joints between each segment. The length of each segment may be determined by the thermal-expansion joint considerations and by cost factors. The overall size and shape of the dielectric barrier will be determined by the dielectric strength requirements of the fuel cell stack, by manifold structural requirements, and by cost considerations.

The design of dielectric barrier 50 may be varied in a number of ways. As illustrated in FIGS. 4B and 4C, ceramic member 52 may be substantially U-shaped, and the dielectric barrier of the present invention may have three gaskets 53, 54 and 56, see FIG. 4C. Yet another design of dielectric barrier 50 is shown in FIG. 4D. In that embodiment, the gasket between ceramic member 52 and flange portion 42a of the manifold has been eliminated, and ceramic member 52 is attached directly to manifold flange portion 42a.

Although specific embodiments of the invention have been described herein in detail, the invention is not to be limited to only such embodiments, but rather only by the appendant claims.

What is claimed is:

1. A fuel cell electrical power generation apparatus, comprising:
   (a) a fuel cell;
   (b) external manifolds for respectively conveying an oxygen-rich gas and fuel into said fuel cell and for carrying away spent products from said fuel cell; and
   (c) manifold barrier means for dielectrically isolating said fuel cell from said manifolds wherein said barrier means includes:
      (i) an impermeable ceramic member, and
      (ii) a gasket intermediate of and contiguous with said ceramic member and said fuel cell.

2. The fuel cell system of claim 1 wherein said gasket comprises a porous ceramic crush gasket.

3. The fuel cell system of claim 1 wherein said barrier means comprises a multiple number of discrete segments joined together to dielectrically isolate said fuel cell from said manifolds.

4. A fuel cell electrical power generation apparatus, comprising:
(a) a fuel cell;
(b) two external reactant manifolds for respectively conveying an oxygen-rich gas and fuel into said fuel cell;
(c) two external discharge manifolds for carrying spent products away from said fuel cell; and
(d) manifold barrier means for dielectrically isolating said fuel cell from each of said manifolds wherein said barrier means includes:
(i) an impermeable ceramic member, and
(ii) a ceramic gasket intermediate of and contiguous with said ceramic member and said fuel cell.

5. A fuel cell electrical power generation apparatus, comprising:
(a) a fuel cell;
(b) external manifolds for respectively conveying an oxygen-rich gas and fuel into said fuel cell and for carrying away spent products from said fuel cell; and
(c) manifold barrier means for dielectrically isolating said fuel cell from said manifolds wherein said barrier means includes:
(i) an impermeable ceramic member,
(ii) a first gasket intermediate of and contiguous with said ceramic member and said fuel cell, and
(iii) a second gasket intermediate of and contiguous with said ceramic member and said manifolds.

6. The fuel cell system of claim 5 wherein said first and second gaskets each comprise porous ceramic crush gaskets.

7. The fuel cell system of claim 8 wherein said barrier means comprises a multiple number of discrete segments joined together to dielectrically isolate said fuel cell from said manifolds.

8. A power section of a fuel cell electrical power generation system, comprising:
(a) a fuel cell stack;
(b) a first external reactant manifold for conveying fuel into said fuel cell stack;
(c) a second external reactant manifold for conveying oxygen-rich gas into said fuel cell stack; and
(d) a pair of external discharge manifolds for conveying spent products away from said fuel cell stack; and
(e) a manifold dielectric barrier for dielectrically isolating said fuel stack from said reactant and discharge manifolds, said manifold barrier including:
(i) an impermeable ceramic member to block the flow of electrolyte from said fuel cell,
(ii) a first porous ceramic gasket intermediate of and contiguous with said ceramic member and said fuel cell stack, and
(iii) a second porous ceramic gasket intermediate of and contiguous with said ceramic member and each of said manifolds.

9. A power section of a fuel cell electrical power generation system, comprising:
(a) a fuel cell stack;
(b) a first external reactant manifold joined to said fuel cell stack for conveying fuel into said fuel cell stack;
(c) a second external reactant manifold joined to said fuel cell stack for conveying oxygen-rich gas into said fuel cell stack;
(d) a pair of external reactant manifolds joined to said fuel cell stack for conveying spent products away from said fuel cell stack; and
(e) a manifold dielectric barrier disposed about the periphery of that side of said manifolds facing said fuel cell stack between said fuel cell stack and said manifolds for dielectrically isolating said fuel stack from said manifolds, said manifold barrier including:
(i) an impermeable ceramic member for preventing a shunt current path from forming between said fuel cell stack and said manifolds,
(ii) a first porous ceramic gasket intermediate of and contiguous with said ceramic member and said fuel cell stack, and
(iii) a second porous ceramic gasket intermediate of and contiguous with said ceramic member and each of said manifolds.

10. The fuel cell system of claim 9 wherein said first and second ceramic gaskets are crush gaskets.

11. The fuel cell system of claim 10 wherein said manifold barrier comprises a multiple number of discrete segments joined together to dielectrically isolate said fuel cell stack from said manifolds.

12. The fuel cell system of claim 9 wherein said ceramic member is substantially U-shaped.

13. A method for dielectrically isolating a fuel cell from external manifolds, comprising:
disposing an impermeable ceramic member intermediate of said fuel cell and said manifolds to prevent the formation of a shunt current path therebetween; and
disposing a first porous ceramic gasket intermediate of and contiguous with said ceramic member and said fuel cell.

14. A method for dielectrically isolating a fuel cell from external reactant manifolds, comprising:
disposing an impermeable ceramic member intermediate of said fuel cell and said manifolds to prevent the formation of a shunt current path therebetween;
disposing a first porous ceramic gasket intermediate of and contiguous with said ceramic member and said fuel cell; and
disposing a second porous ceramic gasket intermediate of and contiguous with said ceramic member and each of said manifolds.

15. The method of claim 14 wherein there is a plurality of fuel cells forming a fuel cell stack.

* * * * *